May 22, 1962     P. E. WILKINS     3,035,958

METHOD OF JOINING POLYETHYLENE PIPE

Filed Nov. 5, 1959

INVENTOR.
P. E. WILKINS
BY Hudson and Young

ATTORNEYS

United States Patent Office
3,035,958
Patented May 22, 1962

3,035,958
METHOD OF JOINING POLYETHYLENE PIPE
Paul E. Wilkins, Bartlesville, Okla., assignor to Phillips Petroleum Company, a corporation of Delaware
Filed Nov. 5, 1959, Ser. No. 851,047
3 Claims. (Cl. 156—294)

This invention relates to a novel thermoplastic pipe fitting and to a novel method for making welds of thermoplastic pipe.

A recent discovery in the art of making 1-olefin polymers in general and polymers of ethylene in particular has created a new and widespread interest in these polymers. This discovery is a method for making polyethylene which has a high degree of crystallinity with the concomitant benefits of high melting point, high density and high value of tensile strength. The polymers find particular utility in the form of pipe and tubing used to transport fluids under various pressures ranging up to about 750 pounds per square inch. Ethylene polymer pipe joints have been made successfully by welding and also by flange connections where the flanges are welded to the ends of the pipe joints and the couplings are then made by bolting the halves of the flanges together. These types of joints, however, have disadvantages in that certain uses, as an example, the welding of pipes in field service, are time consuming and require the presence of a skilled person as well as tools designed for the particular application. As another example, the use of flanges is time consuming, expensive and cumbersome. Conventional thread fittings have not been successful in ethylene polymer pipes and in other plastic pipes wherein the materials are subject to notch sensitivity and to cold creep characteristics.

Broadly, the present invention overcomes the above difficulties by making a fitting from a particular form of polyethylene. Thus the invention comprises a method of welding solid polyethylene pipe by employing polyethylene having a melt index (ASTM D1238–57T) below 0.2 and heating the fitting to a temperature above the crystalline freezing point and inserting the ends of the pipe to be welded into this coupling whereby the residual heat in the coupling will fuse the pipe to the coupling. Pipe couplings constructed from polyethylene having a melt index below 0.2 will retain their shape when heated above the crystalline freezing point of the polyethylene and this temperature is sufficiently high to soften polyethylene normally used in the construction of pipe. The melt index limit given is very important and must be adhered to in order to obtain the benefits of the present invention. The production of polyethylene having such a melt index is fully described in a copending application of G. T. Leatherman et al., Serial No. 590,567, filed June 11, 1956.

The Leatherman et al. process comprises contacting ethylene or mixtures of ethylene with other unsaturated hydrocarbons with a suspension of chromium oxide-containing catalyst in a liquid hydrocarbon diluent, the contact occurring at a temperature such that substantially all of the polymer produced is insoluble in the diluent and is in solid particle form, the particles being substantially non-tacky and non-agglutinative in the liquid diluent.

The liquid hydrocarbon diluent serves as an inert dispersant and heat transfer medium in the practice of the process. While the liquid hydrocarbon is a solvent for the ethylene feed, the polymer at the temperature at which the polymerization is carried out is insoluble in the liquid hydrocarbon. Liquid hydrocarbons which can be used are those which are liquid and chemically inert under the reaction conditions. Paraffins, such as those having from 3 to 12, preferably from 3 to 8, carbon atoms per molecule can be advantageously utilized. Examples of paraffins which can be used include propane, n-butane, n-pentane, isopentane, n-hexane, n-decane, 2,2,4-trimethylpentane (isooctane), and the like. It is to be understood that some naphthenes can be tolerated in the liquid paraffin, and that mixtures of paraffins and/or isoparaffins can be employed. Another class of hydrocarbons which can be used are naphthenic hydrocarbons having from 5 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. A preferred subclass of naphthenic hydrocarbons within the above-described general class is constituted by those naphthenic hydrocarbons having from 5 to 6 carbon atoms in a single ring and from 0 to 2 methyl groups as the only substituents on the ring. Thus, the preferred naphthenic hydrocarbons are cyclopentane, cyclohexane, methylcyclopentane, methylcyclohexane, and dimethylcyclopentanes, and the dimethylcyclohexanes. Mixtures of paraffinic and naphthenic hydrocarbons can be used.

When utilizing butane and higher paraffinic hydrocarbons as the reaction medium, the polymerization temperature is generally in the range of about 230° F. and below, preferably 225° F. and below. Propane, having a critical temperature of about 206° F., is useful in the range in which it can be maintained in the liquid phase. The temperature range for naphthenic hydrocarbons is about 190° F. and below, preferably about 180° F. and below. If mixtures of paraffinic and naphthenic hydrocarbons are employed, the upper temperature limit will be between 190 and 230° F., depending upon the composition of the mixture.

With regard to the upper temperature limits set forth hereinabove, in the case of paraffinic diluents, the temperature is approximately 230° F. and for cycloparaffinic diluents approximately 190° F. There is a very narrow temperature range or area where the transformation, i.e., from tacky, agglomerated polymer to granular polymer, takes place, and conditions can be varied so as to change the absolute upper limit slightly. However, the absolute upper limits for paraffins and cycloparaffins are approximately the temperatures indicated, and at the preferred upper limits granular polymer is formed in all cases. The lower temperature limit for practicing the process is not critical, but the reaction rate is undesirably low below 150° F. and impractical below 100° F.

Various reaction systems can be utilized, including mechanically agitated or stirred reactors and jet agitated reactors. When operating agitated reactors the reaction mixture comprises solid polymer particles containing catalyst, suspended because of the agitation of the liquid hydrocarbon. Substantially all of the polymer produced is in solid particle form, only a small amount (usually not over 1 or 2 weight percent of the total polymer) of light polymer being dissolved in the liquid hydrocarbon. Accordingly, the continuous phase at compositions discussed hereinafter has a viscosity only slightly higher than that of the reaction medium, and the total suspension or slurry has a viscosity which is substantially that of the continuous phase. The low viscosity suspension enables the polymerization to be effected with a good heat transfer and relatively low power requirements.

When operating at 230° F. and below, substantially all of the polymer formed remains as a solid in the form of small particles which contain the catalyst. The liquid hydrocarbon, which is used as the reaction medium, dissolves very little of the polymer so that the hydrocarbon retains its low viscosity. In part because of this low viscosity and in part because of the non-agglomerating properties of the polymer-catalyst particles formed, the desirable operating characteristics of easy mixing and good heat transfer are maintained with polymer concentrations as high as from 25 to 30 percent of the reaction mixture. Under some conditions, the process can be operated with polymer concentrations as high as 50 percent and higher of the reaction mixture. Ease of mixing is important because of low power demands while good heat transfer characteristics are desirable in facilitating temperature control of the exothermic reaction.

Several other advantages result from carrying out the polymerization of ethylene in this manner. Thus, since the polymer produced in the process is in the form of small particles, the separation of the polymer from the reaction mixture is greatly facilitated. The polymer can be readily and easily separated from the liquid hydrocarbon by well known filtration or decantation methods, or the liquid hydrocarbon can be removed from the polymer merely by flashing off the hydrocarbon. Another important advantage arises from the fact that the liquid hydrocarbon used to maintain the slurry dissolves little of the polymer and thus retains its low viscosity. Because of the low viscosity of the reaction medium, it becomes possible to operate with high polymer concentrations in the reaction zone and thereby obtain high productivities. For example, it is possible to obtain yields as high as 1500 pounds and higher of polymer per pound of catalyst. When obtaining such high yields, it then becomes unnecessary to treat the polymer for catalyst removal. Furthermore, by operating in the low temperature range, a polymer can be obtained which has a higher molecular weight than the polymers produced when operating in the intermediate and high ranges.

One modification of this process comprises contacting ethylene in a reaction zone with a suspension of a chromium oxide-containing catalyst in a liquid hydrocarbon selected from the group consisting of paraffinic and naphthenic hydrocarbons, the contacting occurring at a temperature in the range of 150 to 230° F. when said liquid hydrocarbon is a paraffin, and at a temperature in the range of 150 to 190° F. when said liquid hydrocarbon is a naphthenic hydrocarbon; removing a mixture of liquid hydrocarbon and polymer from the reaction zone; and separating polymer from the mixture. More desirably, the polymerization is carried out at a temperature in the range of 150 to 225° F. when the liquid hydrocarbon is a paraffin and in the range of 150 to 180° F. in the case of cycloparaffins.

The catalyst utilized in this invention comprises as an essential ingredient chromium oxide, including a substantial amount of hexavalent chromium. The chromium oxide is ordinarily associated with at least one other oxide, particularly at least one oxide selected from the group consisting of silica, alumina, zirconia and thoria.

The chromium oxide content of the catalyst can range from 0.1 to 10 or more weight percent, e.g., up to about 50 percent or higher, usually 50 percent or less, but the preferred range is from 2 to 6 weight percent, expressed as elemental chromium. A preferred non-chromium component is a silica-alumina composite containing a major proportion of silica and a minor proportion of alumina. While the method for preparing the silica-alumina composite undoubtedly effects to some extent the catalyst acivity, it appears that composites prepared by any of the prior art processes for preparing such catalytically active composites, e.g., coprecipitation or impregnation, are operative. Methods for the preparation and activation of this catalyst are described in detail in the Hogan and Banks Patent No. 2,825,721. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from about 450 to 1500° F., preferably from about 900 to about 1000° F., under nonreducing conditions, for example, with a stream of substantially anhydrous (dew point preferably 0° F. or lower) oxygen-containing gas, such as air. A commercial micro-spheroidal silica-alumina composite can also be advantageously used in the preparation of the catalyst.

The catalyst as imployed in the instant process is in the form of a relatively fine powder so that it may be easily maintained in suspension or as a slurry in the liquid hydrocarbon. The catalyst powder generally has a particle size of 30 mesh and smaller, preferably 50 mesh and smaller. While the catalyst size is not critical, it should be small enough so that it can be readily maintained as a slurry in the liquid hydrocarbon.

The concentration of catalyst in the reaction mixture is not critical and will depend primarily upon the economics of the specific application of the instant process; it can be stated that the concentration of catalyst in the reaction zone will generally be in the range of 0.01 to 5 weight percent, preferably 0.05 to 1.0 weight percent, based upon the total amount of reaction medium, i.e., liquid hydrocarbon diluent, present in the reaction zone.

The contact time can vary widely for any given set of operating conditions and will also depend to some degree upon economic considerations. For example, the contact time for any particular set of operating conditions should not be so long as to allow an excessive concentration of polymer to build up in the reaction mixture. It can be stated that the contact time will generally be in the range of 0.1 to 12 hours, preferably from 1 to 5 hours. The pressure in the system need only be sufficient to maintain the liquid hydrocarbon substantially in the liquid phase and will ordinarily range from about 100 to about 700 p.s.i.

Figure 1:
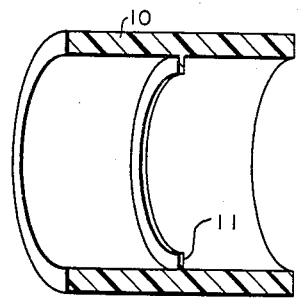
FIGURE 1 is a vertical, cross-sectional view of a pipe coupling of the invention.

The coupling 10 shown in FIGURE 1 is made of rigid polyethylene having a melt index below 0.2 as above described and has an internal shoulder 11 of about the thickness of the pipe to be coupled. The shoulder 11 can be slightly shorter than the pipe thickness and should be about as thick as the pipe wall. The inside diameter of the coupling, exclusive of the shoulder, should be slightly greater than the outside diameter of the pipe to be coupled so as to allow the pipe to be inserted freely but snugly into the coupling. The wall thickness of the coupling should be at least that of the pipe to be welded so as to store sufficient heat to melt a portion of the surface of the pipe so that fusion of the pipe and coupling is accomplished.

Figure 2:
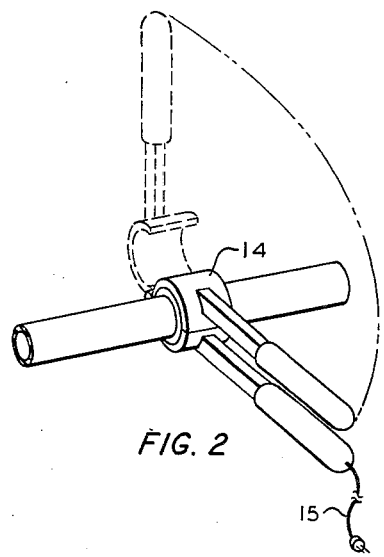
FIGURE 2 illustrates a preferred method of welding two joints of pipe according to the invention.

Any convenient means for heating the coupling can be employed. FIGURE 2 illustrates a clam shell heater which encloses the coupling and provides heat by means of an electrical resistance wire. Induction heating can also be employed. The couplings can be heated in an oven or in a hot, inert liquid bath. Sulfuric acid is an example of an inert liquid which can be employed in a hot bath. Another liquid is a molten low-melting point metal alloy such as Woods metal. Regardless of the method used for providing the heat, the temperature should be controlled so as to maintain the temperature above the crystalline melting point of the polyethylene of the coupling. The coupling can be heated to about 350 to 400°

F. for producing a weld with pipe having a softening point of about 250 to 260° F. Polyethylene having a melt index below 0.2 can be heated to 600° F. without deformation in the absence of pressure.

Figure 3:
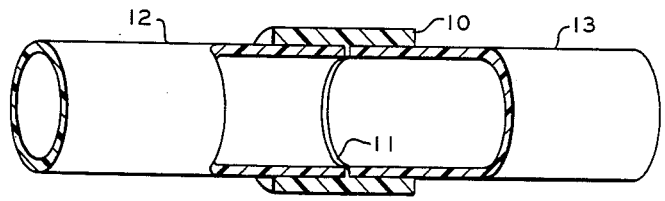
FIGURE 3 is a vertical view, partly in cross section, of a weld according to the invention.

FIGURE 3 illustrates a completed weld. The outer portion of the joints of pipes 12 and 13 will be fused to the inside of the coupling. This cannot be illustrated satisfactorily in the drawing. The weld is accomplished without formation of "flash" on the inside of the pipe and no special tools are required.

The following example will be helpful in understanding the invention but is not to be construed as limiting the invention.

*Example*

A compression molded 1-inch coupling fabricated from polyethylene prepared as hereinbefore described and having a melt index (ASTM D1238-57T) of less than 0.01 was heated in an oven to a temperature of 400° F. The ends of 1-inch schedule 40 linear polyethylene pipes having a softening point in the range 260 to 270° F. were forced firmly into the coupling and held in place until the temperature of the coupling was cooled to about 250° F. A firm weld, free from leaks, resulted. No "flash" resulted on the inside of the pipe and there was no distortion of the pipe or coupling.

The melt index was determined by ASTM method D-1238-57T using condition wherein melt index was determined at 190° C. and a load of 21,600 grams. A value of about 0.01 is considered the lower limit of accuracy of the test and therefore values between 0 and 0.01 are reported as less than 0.01.

The softening point was determined by the use of a Goodrich plastometer as described by Karrer, Davies and Dieterich, Industrial and Engineering Chemistry, Analytical Edition, 2, 96–99 (1930). On the plasticity curve (temperature v. softness) obtained according to the method, the point at which the tangent to the curve had a slope of 60° was determined and the corersponding temperature was read on the temperature axis.

The polyethylene pipe was made from polyethylene prepared according to the method described and claimed in U.S. Patent 2,825,721 issued to J. P. Hogan et al. on March 4, 1958. Such polyethylene usually has a softening point above about 260° F. but can be as low as about 250° F. When used in the practice of this invention the polyethylene pipe preferably will have a softening point between about 250° F. and about 280° F. and it is preferred that the polyethylene pipe having a melt index above 0.2 although the invention can be practiced when the polyethylene of the pipe has the same melt index value as that of the polyethylene of the coupling. When the polyethylene of the pipe and the coupling is the same, or has the same value of melt index, it is necessary that the ends of the pipe be pushed firmly against the shoulder in the coupling so as to accomplish a firm weld at that point.

The pipe, to be welded by this invention, can be fabricated from copolymers such as copolymers of ethylene and propylene.

A feature of the invention is its applicability to small diameter, rigid and flexible polyethylene pipe, such as ¼-inch pipe, in that the coupling can be wrapped with metal foil and heated with a match or cigarette lighter. Pipe joints, particularly small pipe joints, can be welded by the method of the invention with a minimum of effort, skill, time and equipment.

Reasonable variations and modifications are possible within the scope of this disclosure without departing from the spirit and scope of the invention.

That which is claimed is:

1. In the method for welding joints of polyethylene pipe together by inserting said pipe into polyethylene coupling and heating the coupling and pipe to fuse same together, the improvement comprising heating a coupling made of polyethylene having a melt index of less than 0.2 to a temperature in the range of about 300 to about 600° F.; inserting said joints into said heated coupling; and maintaining said joints in said coupling until the coupling has cooled to ambient temperature.

2. The method for making a welded connection between two joints of polyethylene pipe having a softening point below about 300° F. which comprises heating a coupling, made of polyethylene having a melt index of less than 0.2, and adapted for a snug fit over said pipe, to a temperature in the range of about 300 to about 600° F.; inserting an end of each of said joints of pipe into said heated coupling; cooling said coupling while in contiguous contact with said pipe to a temperature below the softening point of said pipe.

3. A method of welding two joints of polyethylene pipe having a softening point in the range of about 260–270° F., comprising heating to about 400° F. a coupling of polyethylene having a melt index of less than 0.01, inserting an end of each of said joints into the thus heated coupling, and maintaining said joints in said coupling until said coupling has cooled to about 250° F.

References Cited in the file of this patent

UNITED STATES PATENTS

| | | |
|---|---|---|
| 2,375,586 | Rich | May 8, 1945 |
| 2,498,831 | Veitch | Feb. 28, 1950 |
| 2,642,911 | De Shazor | June 23, 1953 |
| 2,739,829 | Pedlow et al. | Mar. 27, 1956 |
| 2,751,321 | Sans | June 19, 1956 |
| 2,839,441 | Kent | June 17, 1958 |
| 2,930,634 | Merritt | Mar. 29, 1960 |

FOREIGN PATENTS

| | | |
|---|---|---|
| 1,115,103 | France | Dec. 26, 1955 |
| 1,048,106 | Germany | Dec. 31, 1958 |